US012067705B2

(12) United States Patent
Lin et al.

(10) Patent No.: US 12,067,705 B2
(45) Date of Patent: Aug. 20, 2024

(54) METHOD FOR DETECTING DATA DEFECTS AND COMPUTING DEVICE UTILIZING METHOD

(71) Applicant: HON HAI PRECISION INDUSTRY CO., LTD., New Taipei (TW)

(72) Inventors: Tzu-Chen Lin, New Taipei (TW); Tung-Tso Tsai, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 365 days.

(21) Appl. No.: 17/551,477

(22) Filed: Dec. 15, 2021

(65) Prior Publication Data

US 2022/0189008 A1 Jun. 16, 2022

(30) Foreign Application Priority Data

Dec. 16, 2020 (CN) .......................... 202011493147.0

(51) Int. Cl.
G06T 7/00 (2017.01)
G06N 3/08 (2023.01)
G06V 10/40 (2022.01)

(52) U.S. Cl.
CPC ............. *G06T 7/0004* (2013.01); *G06N 3/08* (2013.01); *G06V 10/40* (2022.01); *G06T 2207/20081* (2013.01); *G06T 2207/20084* (2013.01)

(58) Field of Classification Search
CPC ......... G06T 7/0004; G06T 2207/20081; G06T 2207/20084; G06T 2207/30108; G06T 2207/10004; G06N 3/08; G06N 3/045; G06N 7/01; G06N 3/047; G06V 10/40; G06V 10/764; G06V 10/454; G06F 18/241; G06F 18/2415
See application file for complete search history.

(56) References Cited

U.S. PATENT DOCUMENTS

| 5,774,177 A | * | 6/1998 | Lane | .................... G01N 33/367 |
| | | | | 382/111 |
| 10,169,587 B1 | * | 1/2019 | Nix | ...................... H04W 12/041 |
| 10,432,653 B2 | * | 10/2019 | Sim | ...................... H04L 63/1441 |

FOREIGN PATENT DOCUMENTS

| CN | 108038847 | A | * | 5/2018 | ........... G06K 9/6256 |
| CN | 109829916 | | * | 5/2019 | ............ G01R 31/00 |
| CN | 109829916 | A | * | 5/2019 | |
| CN | 112040223 | | * | 12/2020 | ........... H04N 17/002 |
| CN | 112040223 | A | * | 12/2020 | ........... H04N 17/002 |
| CN | 112070727 | | * | 12/2020 | ......... G06F 18/2135 |
| CN | 112070727 | A | * | 12/2020 | ............... G06K 9/46 |
| TW | 202044067 | | | 12/2020 | |

* cited by examiner

*Primary Examiner* — Amara Abdi
(74) *Attorney, Agent, or Firm* — ScienBiziP, P.C.

(57) ABSTRACT

A method for detecting data defects and a computing device applying the method obtains a test image for analysis. A field to which the test image relates is determined. Based on the field, a target convolutional layer is determined from a convolutional neural network. The target convolutional layer is used to extract features of the test image. A target score of the test image and a score threshold corresponding to the field are determined. If the target score is less than the score threshold, it is determined that the test image reveals defects, thereby improving an accuracy of defect detection.

17 Claims, 2 Drawing Sheets

METHOD FOR DETECTING DATA DEFECTS AND COMPUTING DEVICE UTILIZING METHOD

FIELD

The present disclosure relates to a technical field of image processing, specifically a method for detecting data defects, a computing device, and a storage medium.

BACKGROUND

In order to improve qualities of industrial products, the industrial products should be inspected for defects before they are packaged. A method for inspecting the industrial products is to use a supervised learning classification model to determine whether there are defects appearing in images of the industrial products. However, due to the difficulty of obtaining sufficient training data, the supervised learning classification model cannot be trained to accurately identify whether defects are apparent in the images.

DETAILED DESCRIPTION

The technical solutions in the embodiments of the present disclosure will be described clearly and completely in conjunction with the accompanying drawings in the embodiments of the present disclosure.

Figure 1:
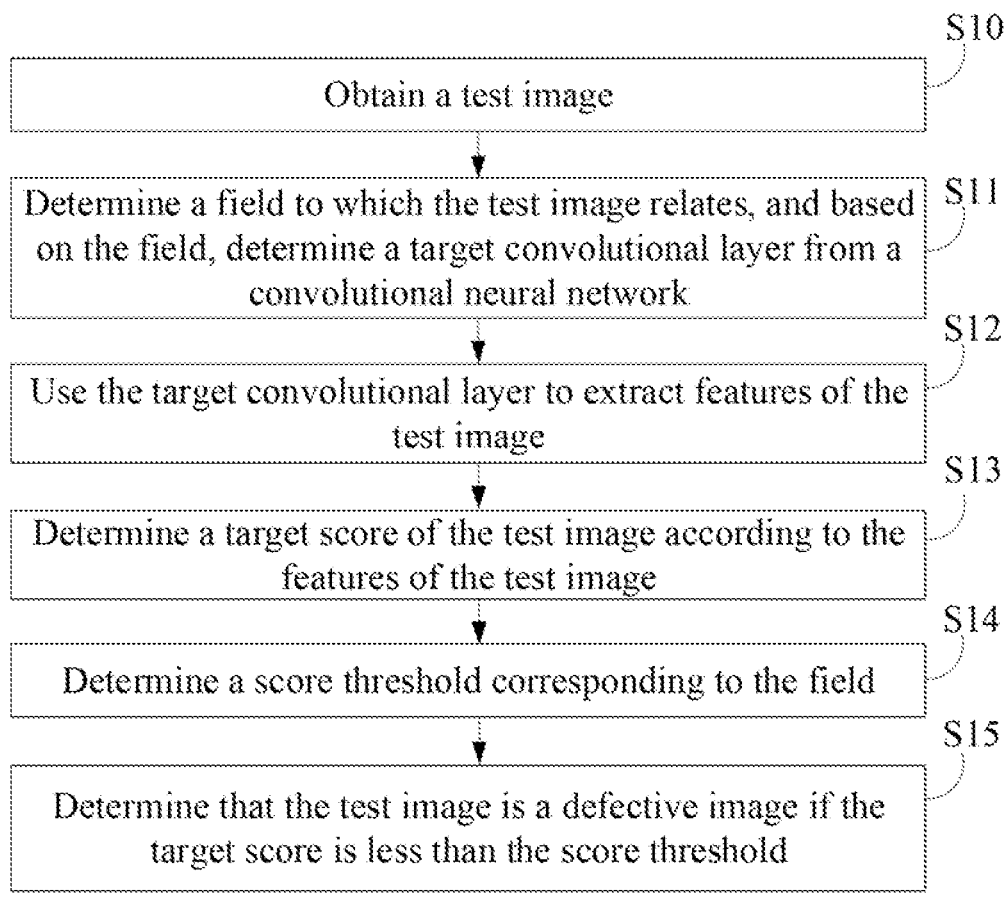
FIG. 1 is a flowchart of a method for detecting data defects provided in one embodiment of the present disclosure.

FIG. 1 is a flowchart of a method for detecting data defects in one embodiment of the present disclosure. The method is used for detecting defects revealed in images. According to different requirements, the order of the steps in the flowchart may be changed, and some steps may be omitted.

Figure 3:
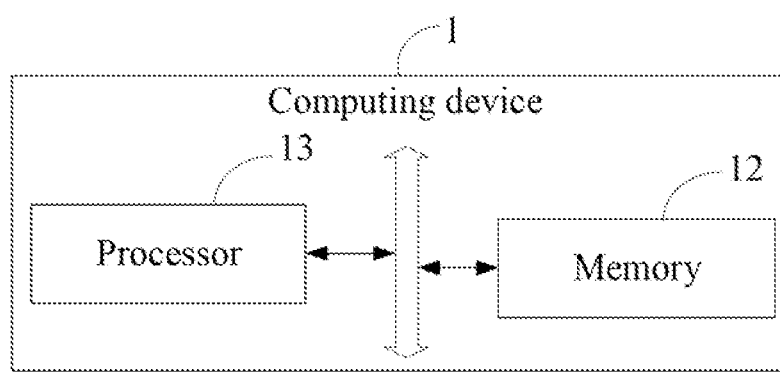
FIG. 3 is a block diagram of a computing device implementing the method in one embodiment of the present disclosure.

The method may be applied to at least one computing device 1 (described in FIG. 3). The computing device 1 is any device that can automatically perform numerical calculation and/or information processing in accordance with pre-set or pre-stored instructions. Hardware of the computing device 1 may include, but is not limited to, a microprocessor, an application specific integrated circuit (ASIC), a field programmable gate array (FPGA), a digital processor (DSP), an embedded device, etc.

The computing device 1 may be any electronic product that can interact with a user, such as a personal computer, a tablet computer, a smart phone, a personal digital assistant (PDA), a game console, an Internet protocol television (IPTV), a smart wearable device, etc.

The computing device 1 may include a network device and/or a user equipment. The network device includes, but is not limited to, a single network device, a server group composed of multiple network devices, or a cloud composed of a large number of hosts or network devices based on cloud computing.

A network where the computing device 1 is located may include, but is not limited to, the Internet, a wide area network, a metropolitan area network, a local area network, a virtual private network (VPN), etc.

In block S10, the computing device obtains a test image for analysis ("test image").

In at least one embodiment of the present disclosure, the test image may be obtained from a camera, or obtained from an image database, or obtained from a website.

The test image may show an object with or without defects.

In at least one embodiment of the present disclosure, a first method of obtaining the test image may include: determining the test object, and using the camera to take an image of the test object as the test image.

The test object can be any product, or any surface of the product.

The camera may be a camera, and the camera may be installed directly in front of the test object.

According to the first method, the test image can be quickly obtained.

A second method of obtaining the test image may include: obtaining an image with a preset identifier from the image database as the test image.

The image database stores a large number of images. There is a relationship between the images and identifiers.

The preset identifier may be "For analysis" or other arbitrary identifiers. The preset identifier may be set by a user.

According to the second method, the test image can be obtained accurately.

A third method of obtaining the test image may include: using a web crawler to crawl a preset web site to obtain the test image.

The preset website may be an enterprise website of a company employing the user.

According to the third method, images finally presented on the preset website can show flawless and defect-free objects.

In block S11, the computing device determines a field to which the test image relates, and based on the field, determines a target convolutional layer from a convolutional neural network.

In at least one embodiment of the present disclosure, the field is that to which the imaged object belongs. For example, the object in the test image is a sheet metal chassis, the field may be sheet metal.

The convolutional neural network may be VGG-16.

The target convolutional layer refers to a convolutional layer with the best image feature extraction in the convolutional neural network.

In at least one embodiment of the present disclosure, a method of determining the field to which the test image relates may include: determining the test object in the test image, and determining the field according to the test object.

According to the embodiment, the field to which the test image relates can be determined quickly and accurately.

In at least one embodiment of the present disclosure, the convolutional neural network includes a plurality of convolutional layers, a method of determining the target convolutional layer from the convolutional neural network based on the field may include: acquiring a plurality of training images relate to the field, the training images include images of defect-free products (normal images) and images of defective products (defective images); obtaining a convolution kernel of each convolutional layer of the convolutional neural network; using the convolution kernel to perform a convolution operation on each of the training images to obtain a feature map of the convolutional layer; performing a pooling operation on the feature map to obtain a low-dimensional vector of the convolutional layer; using a t-distributed stochastic neighbor embedding (T-SNE) algorithm to visualize the low-dimensional vector to obtain a distribution image of the convolutional layer; and determining the target convolutional layer according to distribution images of all the convolutional layers of the convolutional neural network.

By using the convolutional neural network to process the training images relating to the field, it can be ensured that the target convolutional layer is suitable for feature extraction of the test image. At the same time, by analyzing the training images that include images of defect-free products and defective products, the target convolutional layer can extract not only features of images revealing defects, but also features of images revealing defects.

A method of determining the target convolutional layer according to the distribution images of all the convolutional layers of the convolutional neural network includes: traversing the distribution images to determine a distribution image with a best distribution as a target distribution image; determining a convolutional layer corresponding to the target distribution image as the target convolutional layer.

In block S12, the computing device uses the target convolutional layer to extract features of the test image.

In at least one embodiment of the present disclosure, the computing device uses a convolution kernel of the target convolutional layer to extract the features of the test image.

In at least one embodiment of the present disclosure, a method of using the target convolutional layer to extract the features of the test image includes: obtaining a target convolution kernel of the target convolutional layer, and using the target convolution kernel to extract the features of the test image.

The target convolution kernel may be denoted as a 2*2 matrix or a 3*3 matrix, which is not limited in the present disclosure.

In block S13, the computing device determines a target score of the test image according to the features of the test image.

In at least one embodiment of the present disclosure, a method of determining the target score of the test image according to the features of the test image includes: performing an average pooling processing on the features of the test image to obtain a target vector; and inputting the target vector into a pre-trained Gaussian mixture model (GMM) to obtain the target score.

The Gaussian mixture model can use a Gaussian probability density function (normal distribution curve) to accurately quantify the target vector.

In at least one embodiment of the present disclosure, before inputting the target vector of the test image into the pre-trained Gaussian mixture model, the method for detecting data defects further includes: acquiring a plurality of low-dimensional vectors; dividing the plurality of low-dimensional vectors into a training set, a test set, and a verification set; based on a maximum expectation algorithm, iteratively training the training set to obtain a learner; testing the learner with the test set to obtain a test result; if the test result is less than a configured value, optimizing parameters of the learner with the verification set to obtain the Gaussian mixture model.

By the above procedure, the Gaussian mixture model has better performance.

In at least one embodiment, before dividing the plurality of low-dimensional vectors into a training set, a test set, and a verification set, the method further includes: calculating a number of the low-dimensional vectors; determining whether the number is less than a preset number threshold; and when the number is less than the preset number threshold, increasing the number of the low-dimensional vectors by using a data enhancement algorithm.

Through the above embodiment, it is possible to avoid a poor generalization ability of the estimated probability generated by the Gaussian mixture model obtained by training due to an insufficient number of low-dimensional vectors.

In block S14, the computing device determines a score threshold corresponding to the field.

In at least one embodiment, the training images include images of defect-free products (normal images) and images of defective products (defective images), a method of determining a score threshold corresponding to the field includes: inputting the defective images and the normal images into the target convolutional layer to perform a convolution processing, to obtain first feature maps of the defective images and second feature maps of the normal images; determining a target pooling layer corresponding to the target convolutional layer from the convolutional neural network; using the target pooling layer to perform a pooling operation on the first feature maps and the second feature maps to obtain first vectors of the defective images and second vectors of the normal images; inputting the first vectors and the second vectors to the pre-trained Gaussian mixture model to obtain first scores of the defective images and second scores of the normal images; determining an average score of the first scores and the second scores, and determining a standard deviation of the first scores and the second scores; multiplying the standard deviation by a preset value to obtain an operation result; and subtracting the average score from the operation result to obtain the score threshold.

By calculating the average score of the normal images and the defective images and calculating the standard deviation between the normal image and the defective image, the score threshold will be suitable for the field.

In block S15, the computing device determines that the test image is a defective image if the target score is less than the score threshold.

In at least one embodiment, after determining that the test image is a defective image, the method further includes: determining a number of determined defective images; when the number of the determined defective images is greater than a preset number, generating an alarm according to the determined defective images; using a symmetric encryption algorithm to encrypt the information of the alarm to obtain a cipher text; determining an alarm level of the cipher text according to the number of determined defective images; determining an alarm mode according to the alarm level; and sending the cipher text in the alarm mode.

The preset number can be calculated by a tolerance rate of the test image.

The alarm level can be level one, level two, and so on.

The alarm mode can includes delivering audible alerts, by email, telephone, and so on.

Through the above embodiment, when the number of the determined defective images is greater than the preset number, the alarm information can be issued. By encrypting the alarm information, the alarm information can be prevented from being tampered with, and a security of the alarm information is improved. The alarm mode is determined by the alarm level, and the alarm information can be sent in an appropriate alarm mode, which makes the sending of the alarm information more user-friendly.

In at least one embodiment, the method further includes: when the target score is greater than or equal to the score threshold, determining that the test image is a normal image.

By determining the target convolutional layer with the best feature extraction performance, better features of the test image better are extracted, and an accuracy of defect detection can be improved.

Figure 2:
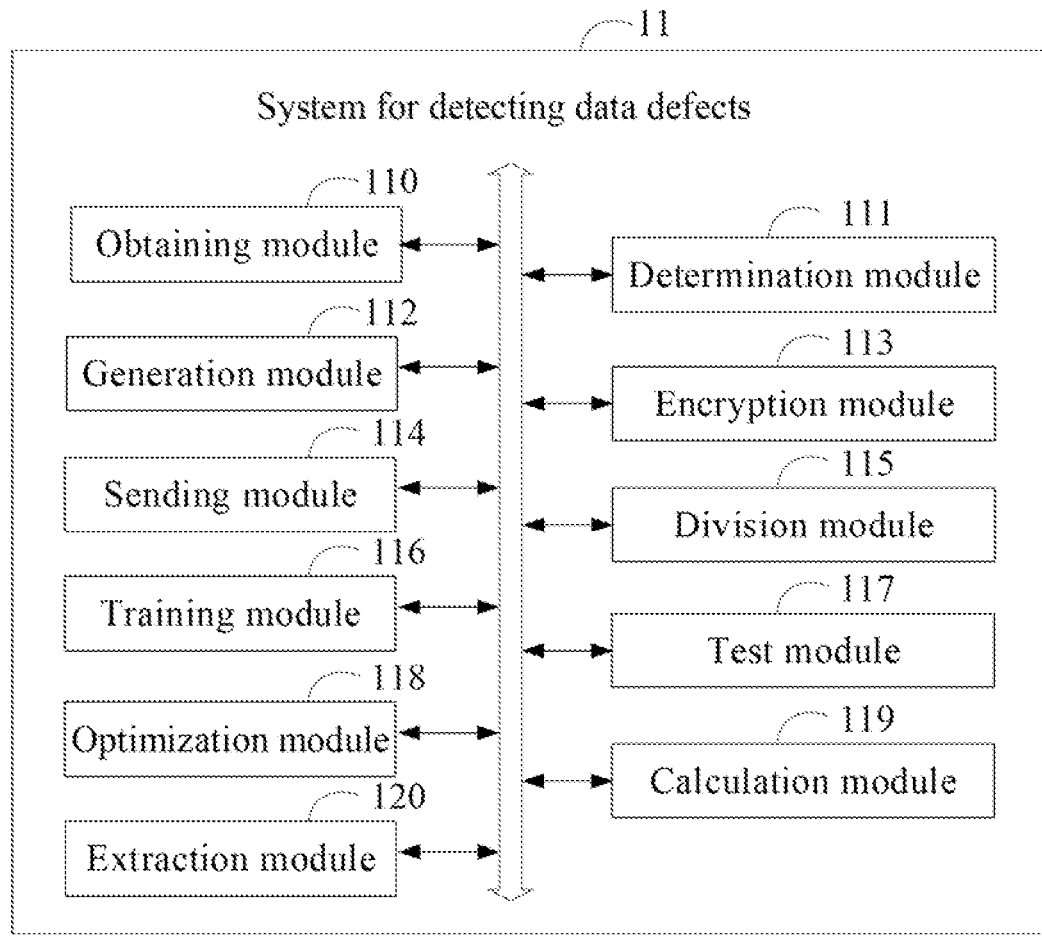
FIG. 2 is a block diagram of a system for detecting data defects provided in one embodiment of the present disclosure.

FIG. 2 is a block diagram of a system for detecting data defects provided in one embodiment of the present disclosure. The device is used for detecting defects revealed in images.

In some embodiments, the system for detecting data defects (system 11) runs in a computing device. The system 11 can include a plurality of function modules consisting of program code segments. The program code of each program code segments in the system 11 can be stored in a memory and executed by at least one processor to perform image processing (described in detail in FIG. 2).

As shown in FIG. 2, the system 11 can include: an obtaining module 110, a determination module 111, a generation module 112, an encryption module 113, a sending module 114, a division module 115, a training module 116, a test module 117, an optimization module 118, a calculation module 119, and an extraction module 120.

A module as referred to in the present disclosure refers to a series of computer-readable instruction segments that can be executed by at least one processor and that are capable of performing fixed functions, which are stored in a memory.

The above-mentioned integrated modules implemented in a form of software functional modules can be stored in a non-transitory readable storage medium. The above software function modules are stored in a storage medium and include several instructions for causing a computing device (which can be a personal computer, a dual-screen device, or a network device) or a processor to execute the method described in various embodiments in the present disclosure.

The obtaining module 110 obtains a test image.

In at least one embodiment of the present disclosure, the test image may be obtained from a camera, or obtained from an image database, or obtained from a website.

The test image may include a test object for analysis.

In at least one embodiment of the present disclosure, the obtaining module 110 obtains the test image by: determining the test object, and using the camera to take an image of the test object as the test image.

The test object can be any product, or any surface of the product.

The camera may be a camera, and the camera may be installed directly in front of the test object.

According to the embodiment, the test image can be quickly obtained.

In another embodiment, the obtaining module 110 obtains the test image by: obtaining an image with a preset identifier from the image database as the test image.

The image database stores a large number of images. There is a relationship between the images and identifiers.

The preset identifier may be "For analysis" or other arbitrary identifiers. The preset identifier may be set by a user.

According to the embodiment, the test image can be obtained accurately.

In yet another embodiment, the obtaining module 110 obtaining the test image may include using a web crawler to crawl a preset website to obtain the test image.

The preset website may be an enterprise website of a company employing the user.

According to the embodiment, images finally presented on the preset website can show no defects.

The determination module 111 determines a field to which the test image relates, and based on the field, determines a target convolutional layer from a convolutional neural network.

In at least one embodiment of the present disclosure, the field is that to which the imaged object (i.e., test object) test image belongs. For example, the test object in the test image is a sheet metal chassis, the field may be sheet metal.

The convolutional neural network may be VGG-16.

The target convolutional layer refers to a convolutional layer with the best image feature extraction in the convolutional neural network.

In at least one embodiment of the present disclosure, the determination module 111 determines the field to which the test image relates by: determining the test object in the test image, and determining the field accordingly test object.

According to the embodiment, the field to which the test image relates can be determined quickly and accurately.

In at least one embodiment of the present disclosure, the convolutional neural network includes a plurality of convolutional layers, the determination module 111 determines the target convolutional layer from the convolutional neural network based on the field by: acquiring a plurality of training images relate to the field, the training images including normal images and defective images; obtaining a convolution kernel of each convolutional layer of the convolutional neural network; using the convolution kernel to perform a convolution operation on each of the training images to obtain a feature map of the convolutional layer; performing a pooling operation on the feature map to obtain a low-dimensional vector of the convolutional layer; using a t-distributed stochastic neighbor embedding (T-SNE) algorithm to visualize the low-dimensional vector to obtain a distribution image of the convolutional layer; and determining the target convolutional layer according to distribution images of all the convolutional layers of the convolutional neural network.

By using the convolutional neural network to process the training images relating to the field, it can be ensured that the target convolutional layer is suitable for feature extraction of the test image. At the same time, by analyzing the training images that includes normal images and defective images, the target convolutional layer can extract not only features of normal images, but also features of defective images.

The determination module 111 may determine the target convolutional layer according to the distribution images of all the convolutional layers of the convolutional neural network by: traversing the distribution images to determine a distribution image with a best distribution as a target distribution image; determining a convolutional layer corresponding to the target distribution image as the target convolutional layer.

The extraction module 120 uses the target convolutional layer to extract features of the test image.

In at least one embodiment of the present disclosure, the extraction module 120 uses a convolution kernel of the target convolutional layer to extract the features of the test image.

In at least one embodiment of the present disclosure, the extraction module 120 uses the target convolutional layer to extract the features of the test image by: obtaining a target convolution kernel of the target convolutional layer, and using the target convolution kernel to extract the features of the test image.

The target convolution kernel may be denoted as a 2*2 matrix or a 3*3 matrix, which is not limited in the present disclosure.

The determination module 111 determines a target score of the test image according to the features of the test image.

In at least one embodiment of the present disclosure, the determination module 111 determines the target score of the test image according to the features of the test image by: performing an average pooling processing on the features of the test image to obtain a target vector; and inputting the target vector into a pre-trained Gaussian mixture model (GMM) to obtain the target score.

The Gaussian mixture model can use a Gaussian probability density function (normal distribution curve) to accurately quantify the target vector.

In at least one embodiment of the present disclosure, before inputting the target vector of the test image into the pre-trained Gaussian mixture model, the division module 115 acquires a plurality of low-dimensional vectors, divides the low-dimensional vectors into a training set, a test set, and a verification set. The training module 116 iteratively trains the training set based on a maximum expectation algorithm to obtain a learner. The test module 117 tests the learner with the test set to obtain a test result. If the test result is less than a configured value, the optimization module 118 optimizes parameters of the learner with the verification set to obtain the Gaussian mixture model.

By the above procedure, the Gaussian mixture model has better performance.

In at least one embodiment, before dividing the low-dimensional vectors into a training set, a test set, and a verification set, the calculation module 119 calculates a number of the low-dimensional vectors. When the number is less than the preset number threshold, the calculation module 119 increases the number by using a data enhancement algorithm.

Through the above embodiment, it is possible to avoid a poor generalization ability of the estimated probability generated by the Gaussian mixture model obtained by training due to an insufficient number of low-dimensional vectors.

The determination module 111 determines a score threshold corresponding to the field.

In at least one embodiment, the training images include normal images and defective images, the determination module 111 determines a score threshold corresponding to the field by: inputting the defective images and the normal images into the target convolutional layer to perform a convolution processing, to obtain first feature maps of the defective images and second feature maps of the normal images; determining a target pooling layer corresponding to the target convolutional layer from the convolutional neural network; using the target pooling layer to perform a pooling operation on the first feature maps and the second feature maps to obtain first vectors of the defective images and second vectors of the normal images; inputting the first vectors and the second vectors to the pre-trained Gaussian mixture model to obtain first scores of the defective images and second scores of the normal images; determining an average score of the first scores and the second scores, and determining a standard deviation of the first scores and the second scores; multiplying the standard deviation by a preset value to obtain an operation result; and subtracting the average score from the operation result to obtain the score threshold.

By calculating the average score of the normal images and the defective images and calculating the standard deviation between the normal image and the defective image, the score threshold will be suitable for the field.

If the target score is less than the score threshold, the determination module 111 determines that the test image is a defective image.

In at least one embodiment, after determining that the test image is a defective image, the determination module 111 determines a number of determined defective images. When the number of the determined defective images is greater than a preset number, the generation module 112 generates an alarm according to the determined defective images. The encryption module 113 uses a symmetric encryption algorithm to encrypt the information of the alarm to obtain a cipher text. The determination module 111 determines an alarm level of the cipher text according to the number of determined defective images. The determination module 111 determines an alarm mode according to the alarm level. The sending module 114 sends the cipher text in the alarm mode.

The preset number can be calculated by a tolerance rate of the test image.

The alarm level can be level one, level two, and so on.

The alarm mode can includes delivering audible alerts, by email, telephone, and so on.

Through the above embodiment, when the number of the determined defective images is greater than the preset number, the alarm information can be issued. By encrypting the alarm information, the alarm information can be prevented from being tampered with, and a security of the alarm information can be improved. The alarm mode is determined by the alarm level, and the alarm information can be sent in an appropriate alarm mode, which makes the sending of the alarm information more user-friendly.

In at least one embodiment, when the target score is greater than or equal to the score threshold, the determination module 111 determines the test image as a normal image.

By determining the target convolutional layer with the best feature extraction performance, better features of the test image better are extracted, and an accuracy of defect detection can be improved.

FIG. 3 is a block diagram of a computing device implementing the method for detecting data defects in one embodiment of the present disclosure.

In one embodiment of the present disclosure, the computing device 1 may include: a memory 12, at least one processor 13, and computer-readable instructions stored in the memory 12 and executable on the at least one processor 13, for example, programs for detecting data defects. The processor 13 executes the computer-readable instructions to implement the steps in the embodiment of the method for detecting data defects, such as in steps in block S10-S15 shown in FIG. 1. Alternatively, the processor 13 executes the computer-readable instructions to implement the functions of the modules/units in the foregoing device embodiments, such as the modules 110-120 in FIG. 2.

For example, the computer-readable instructions can be divided into one or more modules/units, and the one or more modules/units are stored in the memory 12 and executed by the at least one processor 13. The one or more modules/units can be a series of computer-readable instruction segments capable of performing specific functions, and the instruction segments are used to describe execution processes of the computer-readable instructions in the computing device 1. For example, the computer-readable instruction can be divided into the obtaining module 110, the determination module 111, the generation module 112, the encryption module 113, the sending module 114, the division module 115, the training module 116, the test module 117, the optimization module 118, the calculation module 119, and the extraction module 120 as in FIG. 2.

The computing device 1 can be a computing device such as a desktop computer, a notebook, a palmtop computer, and a cloud server. Those skilled in the art will understand that the schematic diagram 3 is only an example of the computing device 1 and does not constitute a limitation on the computing device 1. Another computing device 1 may include more or fewer components than shown in the figures or may combine some components or have different components. For example, the computing device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 13 can be a microprocessor or any conventional processor. The processor 13 is a control center of the computing device 1 and connects various parts of the entire computing device 1 by using various interfaces and lines.

The memory 12 can be configured to store the computer-readable instructions and/or modules/units. The processor 13 may run or execute the computer-readable instructions and/or modules/units stored in the memory 12 and may call up data stored in the memory 12 to implement various functions of the computing device 1. The memory 12 mainly includes a storage program area and a storage data area. The storage program area may store an operating system, and an application program required for at least one function (such as a sound playback function, an image playback function, etc.), etc. The storage data area may store data (such as audio data, phone book data, etc.) created according to the use of the computing device 1. In addition, the memory 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the computing device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset disclosure, the disclosed computing device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

We claim:

1. A method for detecting data defects, the method comprising:
    obtaining a test image;
    determining a field to which the test image relates, and based on the field, determining a target convolutional layer from a convolutional neural network;
    using the target convolutional layer to extract features of the test image;
    determining a target score of the test image according to the features of the test image;
    acquiring a plurality of training images relate to the field, the training images comprising normal images and defective images;
    determining a score threshold corresponding to the field, comprising:
        inputting the defective images and the normal images into the target convolutional layer to perform a convolution processing, to obtain first feature maps of the defective images and second feature maps of the normal images;
        determining a target pooling layer corresponding to the target convolutional layer from the convolutional neural network;

using the target pooling layer to perform a pooling operation on the first feature maps and the second feature maps to obtain first vectors of the defective images and second vectors of the normal images;

inputting the first vectors and the second vectors to a pre-trained Gaussian mixture model (GMM) to obtain first scores of the defective images and second scores of the normal images;

determining an average score of the first scores and the second scores, and determining a standard deviation of the first scores and the second scores;

multiplying the standard deviation by a preset value to obtain an operation result; and subtracting the average score from the operation result to obtain the score threshold; and determining that the test image is a defective image if the target score is less than the score threshold.

2. The method for detecting data defects according to claim 1, wherein obtaining a test image comprises:

determining a test object, and using a camera to take an image of the test object as the test image;

obtaining an image with a preset identifier from an image database as the test image; or using a web crawler to crawl a preset website to obtain the test image.

3. The method for detecting data defects according to claim 1, wherein determining a target convolutional layer from a convolutional neural network comprises:

obtaining a convolution kernel of each convolutional layer of the convolutional neural network;

using the convolution kernel to perform a convolution operation on each of the training images to obtain a feature map of the convolutional layer;

performing a pooling operation on the feature map to obtain a low-dimensional vector of the convolutional layer;

using a t-distributed stochastic neighbor embedding (T-SNE) algorithm to visualize the low-dimensional vector to obtain a distribution image of the convolutional layer; and determining the target convolutional layer according to distribution images of all the convolutional layers of the convolutional neural network.

4. The method for detecting data defects according to claim 1, wherein determining a target score of the test image according to the features of the test image comprises:

performing an average pooling processing on the features of the test image to obtain a target vector; and inputting the target vector into the pre-trained GMM to obtain the target score.

5. The method for detecting data defects according to claim 1, after determining that the test image is a defective image, further comprising:

determining a number of determined defective images;

when the number of the determined defective images is greater than a preset number, generating an alarm according to the determined defective images;

using a symmetric encryption algorithm to encrypt the information of the alarm to obtain a cipher text;

determining an alarm level of the cipher text according to the number of determined defective images;

determining an alarm mode according to the alarm level; and sending the cipher text in the alarm mode.

6. The method for detecting data defects according to claim 1, further comprising:

when the target score is greater than or equal to the score threshold, determining that the test image is a normal image.

7. A computing device comprising a memory and a processor, the memory stores computer-readable instructions, and the processor executes the computer-readable instructions to implement a method for detecting data defects, the method comprising:

obtaining a test image;

determining a field to which the test image relates, and based on the field, determining a target convolutional layer from a convolutional neural network;

using the target convolutional layer to extract features of the test image;

determining a target score of the test image according to the features of the test image;

acquiring a plurality of training images relate to the field, the training images comprising normal images and defective images;

determining a score threshold corresponding to the field, comprising:

inputting the defective images and the normal images into the target convolutional layer to perform a convolution processing, to obtain first feature maps of the defective images and second feature maps of the normal images;

determining a target pooling layer corresponding to the target convolutional layer from the convolutional neural network;

using the target pooling layer to perform a pooling operation on the first feature maps and the second feature maps to obtain first vectors of the defective images and second vectors of the normal images;

inputting the first vectors and the second vectors to a pre-trained Gaussian mixture model (GMM) to obtain first scores of the defective images and second scores of the normal images;

determining an average score of the first scores and the second scores, and determining a standard deviation of the first scores and the second scores;

multiplying the standard deviation by a preset value to obtain an operation result; and subtracting the average score from the operation result to obtain the score threshold; and determining that the test image is a defective image if the target score is less than the score threshold.

8. The computing device according to claim 7, wherein obtaining a test image comprises:

determining a test object, and using a camera to take an image of the test object as the test image;

obtaining an image with a preset identifier from an image database as the test image; or using a web crawler to crawl a preset website to obtain the test image.

9. The computing device according to claim 7, wherein determining a target convolutional layer from a convolutional neural network comprises:

obtaining a convolution kernel of each convolutional layer of the convolutional neural network;

using the convolution kernel to perform a convolution operation on each of the training images to obtain a feature map of the convolutional layer;

performing a pooling operation on the feature map to obtain a low-dimensional vector of the convolutional layer;

using a t-distributed stochastic neighbor embedding (T-SNE) algorithm to visualize the low-dimensional vector to obtain a distribution image of the convolutional layer; and determining the target convolutional layer according to distribution images of all the convolutional layers of the convolutional neural network.

10. The computing device according to claim 7, wherein determining a target score of the test image according to the features of the test image comprises:

performing an average pooling processing on the features of the test image to obtain a target vector; and inputting the target vector into the pre-trained GMM to obtain the target score.

11. The computing device according to claim 7, after determining that the test image is a defective image, wherein the method further comprises:

determining a number of determined defective images;

when the number of the determined defective images is greater than a preset number, generating an alarm according to the determined defective images;

using a symmetric encryption algorithm to encrypt the information of the alarm to obtain a cipher text;

determining an alarm level of the cipher text according to the number of determined defective images;

determining an alarm mode according to the alarm level; and sending the cipher text in the alarm mode.

12. The computing device according to claim 7, wherein the method further comprises:

when the target score is greater than or equal to the score threshold, determining that the test image is a normal image.

13. A non-transitory storage medium having computer-readable instructions stored thereon, when the computer-readable instructions are executed by a processor to implement a method for detecting data defects, the method comprising:

obtaining a test image;

determining a field to which the test image relates, and based on the field, determining a target convolutional layer from a convolutional neural network;

using the target convolutional layer to extract features of the test image;

determining a target score of the test image according to the features of the test image;

acquiring a plurality of training images relate to the field, the training images comprising normal images and defective images;

determining a score threshold corresponding to the field, comprising:

inputting the defective images and the normal images into the target convolutional layer to perform a convolution processing, to obtain first feature maps of the defective images and second feature maps of the normal images;

determining a target pooling layer corresponding to the target convolutional layer from the convolutional neural network;

using the target pooling layer to perform a pooling operation on the first feature maps and the second feature maps to obtain first vectors of the defective images and second vectors of the normal images;

inputting the first vectors and the second vectors to a pre-trained Gaussian mixture model (GMM) to obtain first scores of the defective images and second scores of the normal images;

determining an average score of the first scores and the second scores, and determining a standard deviation of the first scores and the second scores;

multiplying the standard deviation by a preset value to obtain an operation result; and subtracting the average score from the operation result to obtain the score threshold; and determining that the test image is a defective image if the target score is less than the score threshold.

14. The non-transitory storage medium according to claim 13, wherein obtaining a test image comprises:

determining a test object, and using a camera to take an image of the test object as the test image;

obtaining an image with a preset identifier from an image database as the test image; or using a web crawler to crawl a preset website to obtain the test image.

15. The non-transitory storage medium according to claim 13, wherein determining a target convolutional layer from a convolutional neural network comprises:

obtaining a convolution kernel of each convolutional layer of the convolutional neural network;

using the convolution kernel to perform a convolution operation on each of the training images to obtain a feature map of the convolutional layer;

performing a pooling operation on the feature map to obtain a low-dimensional vector of the convolutional layer;

using a t-distributed stochastic neighbor embedding (T-SNE) algorithm to visualize the low-dimensional vector to obtain a distribution image of the convolutional layer; and determining the target convolutional layer according to distribution images of all the convolutional layers of the convolutional neural network.

16. The non-transitory storage medium according to claim 13, wherein determining a target score of the test image according to the features of the test image comprises:

performing an average pooling processing on the features of the test image to obtain a target vector; and inputting the target vector into the pre-trained GMM to obtain the target score.

17. The non-transitory storage medium according to claim 13, after determining that the test image is a defective image, wherein the method further comprises:

determining a number of determined defective images;

when the number of the determined defective images is greater than a preset number, generating an alarm according to the determined defective images;

using a symmetric encryption algorithm to encrypt the information of the alarm to obtain a cipher text;

determining an alarm level of the cipher text according to the number of determined defective images;

determining an alarm mode according to the alarm level; and sending the cipher text in the alarm mode.

* * * * *